(12) United States Patent
Muehlberger et al.

(10) Patent No.: US 6,712,279 B2
(45) Date of Patent: Mar. 30, 2004

(54) DATA CARRIER COMPRISING AN ARRAY OF CONTACTS

(75) Inventors: Andreas Muehlberger, Graz (AT); Gerald Schaffler, Graz (AT); Joachim Schober, Graz (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/198,810

(22) Filed: Jul. 19, 2002

(65) Prior Publication Data

US 2003/0024996 A1 Feb. 6, 2003

(30) Foreign Application Priority Data

Jul. 31, 2001 (EP) ................................. 01890221

(51) Int. Cl.[7] .................................. G06K 19/06
(52) U.S. Cl. ...................... 235/492; 235/441
(58) Field of Search .............. 361/737; 235/492, 235/487, 441, 451

(56) References Cited

U.S. PATENT DOCUMENTS 5,671,525 A * 9/1997 Fidalgo ................. 235/492
5,710,421 A * 1/1998 Kokubu ................. 235/492
6,145,749 A   11/2000 Thuringer et al. ........ 235/492
6,468,835 B1 * 10/2002 Blanc et al. ............. 438/127

FOREIGN PATENT DOCUMENTS

| EP | 0671705 A2 | 2/1995 | ......... G06K/19/077 |
| WO | WO97/46964 | 6/1996 | ............. G06K/7/06 |
| WO | 0077728 * | 6/1999 | ......... G06K/19/077 |
| WO | WO00/14672 | 9/1999 | ............. G06K/7/00 |

* cited by examiner

Primary Examiner—Daniel St Cyr
(74) Attorney, Agent, or Firm—Kevin Simons

(57) ABSTRACT

A module (1) for a data carrier (3) for performing of operations with contacts and operations without contacts comprising an integrated component (4) with component connections (A1, A2, A3, A4, A5, A7, A8) and having a contact field (5) accessible to counter contacts with module connecting contacts (C1, C2, C3, C4, C5, C6, C7, C8), with each component connection (A1, A2, A3, A5, A7) used for operations with contacts being in an electrically conductive connection with a module connecting contact (C1, C2, C3, C5, C7) of the contact field (5) and each component connection (A4, A8) used for operations without contacts also being in an electrically conductive connection with a module connecting contact (C4, C8) of the contact field (5).

5 Claims, 2 Drawing Sheets

DATA CARRIER COMPRISING AN ARRAY OF CONTACTS

FIELD OF THE INVENTION

The invention relates to a module for a data carrier with the data carrier supporting the performance of both operations with contacts and operations without contacts and with the module containing an integrated component which has component connections used in operations with contacts and which here are in an electrically conductive connection with counter contacts in a communications station and component connections used in operations without contacts and which here are in an electrically conductive connection with counter contacts of transmission means which work in a contactless manner, and with the module having a contact field with module connecting contacts accessible to counter contacts, with each component connection used in operations with contacts being in an electrically conductive connection with a module connecting contact of the contact field.

The invention also relates to a data carrier supporting the performance of both operations with contacts and operations without contacts and which contains a module with the aforesaid embodiment described in the first paragraph.

The invention also relates to a device designed to accommodate and work with a data carrier in accordance with the aforesaid embodiment described in the second paragraph and which contains a communications station which has counter contacts, with which the module connecting contacts in the data carrier module which may be accommodated in the device may be brought into contact, which are in an electrically conductive connection with the component connections used in operations with contacts.

BACKGROUND OF THE INVENTION

In connection with a module described above in the first paragraph and with a data carrier described above in the second paragraph, reference may be made to U.S. Pat. No. 6,145,749 A. From this patent, a data carrier is known that may be used both in operations with contacts and in operations without contacts. The known data carrier has an integrated component which has several component connections which are in an electrically conductive connection with module connecting contacts of a contact field. In addition, the integrated unit has two more other component connections, which are intended for electrically conductive connection with a transmission coil provided as a transmission means which works in a contactless manner, with the two other component connecting contacts being in an electrically conductive connection with two additional module connecting contacts which are not described in any more detail in U.S. Pat. No. 6,145,749 A and with the two additional module connecting contacts each being in contact and in an electrically conductive connection with a counter contact of the transmission coil. In the known embodiment, therefore, additional module connecting contacts are required for the electrically conductive connection of the transmission coil with the module and consequently with the integrated unit, which in many applications represents an unnecessary additional expense and may sometimes represent an unwanted source of errors, so the situation needs to be improved.

SUMMARY OF THE INVENTION

It is an object of the invention to avoid the problems described above and to create an improved module and an improved data medium and an improved device.

To achieve this object, a module according to the invention is provided with features according to the invention, so that a module according to the invention may be characterized in the following way, namely:

A module for a data carrier, which may be used for both operations with contacts and operations without contacts, with the module containing an integrated component, which has component connections used for operations with contacts and here being in an electrically conductive connection with counter contacts of a communication station and having component connections used for operations without contacts and here being in an electrically conductive connection with counter contacts of transmission means which work in a contactless manner, and with the module having a contact field with module connecting contacts accessible to counter contacts, wherein each component connection used for operations with contacts being in an electrically conductive connection with a module connecting contact of the contact field and wherein each component connection used for operations without contacts also being in an electrically conductive connection with a module connecting contact of the contact field.

To achieve the above-described object in addition a data carrier according to the invention is provided with features according to the invention, so that a data carrier according to the invention may be characterized in the following way, namely:

A data carrier, which may be used to support the performance of both operations with contacts and operations without contacts and which comprises a module, with the module containing an integrated component which has component connections used for operations with contacts and which here being in an electrically conductive connection with counter contacts of a communication station and having component connections used for operations without contacts and which here being in an electrically conductive connection with counter contacts of transmission means which work in a contactless manner, and with the module having a contact field with module connecting contacts accessible to counter contacts, wherein each component connection used for operations with contacts being in an electrically conductive connection with a module connecting contact of the contact field and wherein each component connection used for operations without contacts also being in an electrically conductive connection with a module connecting contact of the contact field.

To achieve the above-described object, a device according to the invention is provided with features according to the invention, so that a device according to the invention may be characterized in the following way, namely:

A device, designed to accommodate and work with a data carrier according to the invention and containing a communication station wherein the device having counter contacts, the counter contacts may be brought into contact with the module connecting contacts of the module of the data carrier which may be accommodated in the device, which module connecting contacts being in an electrically conductive connection with the component connections used for operations with contacts, and wherein the device having transmission means which work in a contactless manner and which have counter contacts, the counter contacts may be brought into contact with the module connecting contacts of the data carrier which may be accommodated in the device, which module connecting contacts being in an electrically conductive connection with the component connections used for operations without contacts.

The provision of features according to the invention is a structurally simple and reliable way of ensuring that module connecting contacts in a module's contact field may be used or are used for electrically conductive connections with transmission means which work in a contactless manner, so that separate module connecting contacts, provided additionally and spatially separate from the contact field in the module are not required and therefore may be dispensed with, which is advantageous with regard to a simple structural embodiment and a high degree of reliability and low susceptibility to faults. In connection with the invention, it has been found to be particularly advantageous if module connecting contacts of this type in a module's contact field, which are already provided in the contact field but which are not used for operations with contacts, are used for electrically conductive connections with counter contacts of transmission means which work in a contactless manner, because this achieves a particularly simple structural embodiment, which is of particular advantage if the contact field is designed in accordance with Standard ISO 7816-2, because then module connecting contacts which are already provided, but which are not used for operations with contacts, may be used according to the invention to provide an electrically conductive connection with the counter contacts of transmission means.

In a module according to the invention and a data carrier according to the invention, it has been found to be extremely advantageous if the features in accordance with claim 2 or claim 5 are provided. This ensures that the integrated unit in a module according to the invention or in a data carrier according to the invention not only provides an electrically conductive connection between the external transmission carrier in relation to the module or the data carrier and the module connecting contacts of the contact field provided for this purpose, but that in addition, for example, internally provided transmission means of a data carrier may be provided with an electrically conductive connection with the integrated unit by means of the supplementary connecting contacts.

In a device according to the invention, the measures according to the invention have, therefore, been found to be particularly advantageous because the provision of the measures according to the invention enables transmission media to be provided in a device according to the invention, with the insertion of a data carrier according to the invention in the device, the transmission media automatically entering into an active connection with the data carrier's module connecting contacts provided for this purpose via the transmission means' counter contacts, so that after the insertion of a data carrier according to the invention and establishment of the electrically conductive connections with the transmission means resulting from this, a data carrier configuration suitable for the performance of operations without contacts is obtained. Here, it is particularly advantageous for the transmission means to be implemented independently of the data carrier in the device and thus to be dimensioned independently of the data carrier dimensions, which, for example, in the case of a transmission coil as transmission means has the advantage that the effective area of the transmission coil may be made much larger than the area of the data carrier.

The above-described aspects and further aspects of the invention may be derived from the following embodiments and are described using these embodiments.

BRIEF DESCRIPTION OF THE DRAWINGS

The invention will be further described with reference to embodiments shown in the drawings to which, however, the invention is not limited.

DETAILED DESCRIPTION OF THE INVENTION

Figure 1:
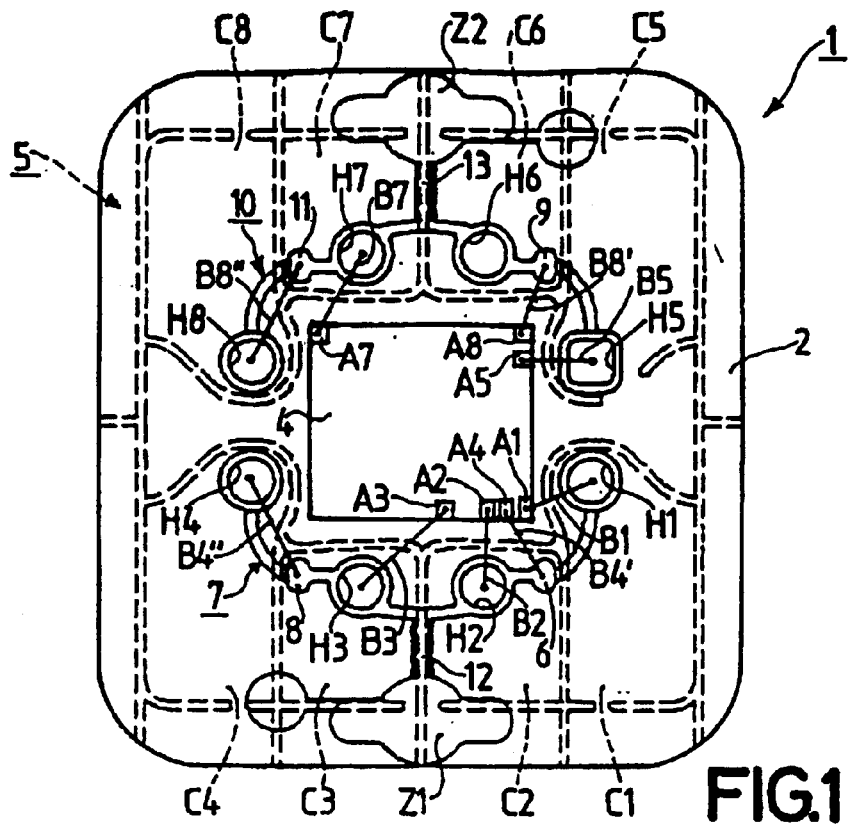
FIG. 1 shows in a top view and on a greatly increased scale compared to the natural size a module according to a first embodiment of the invention.
Figure 3:
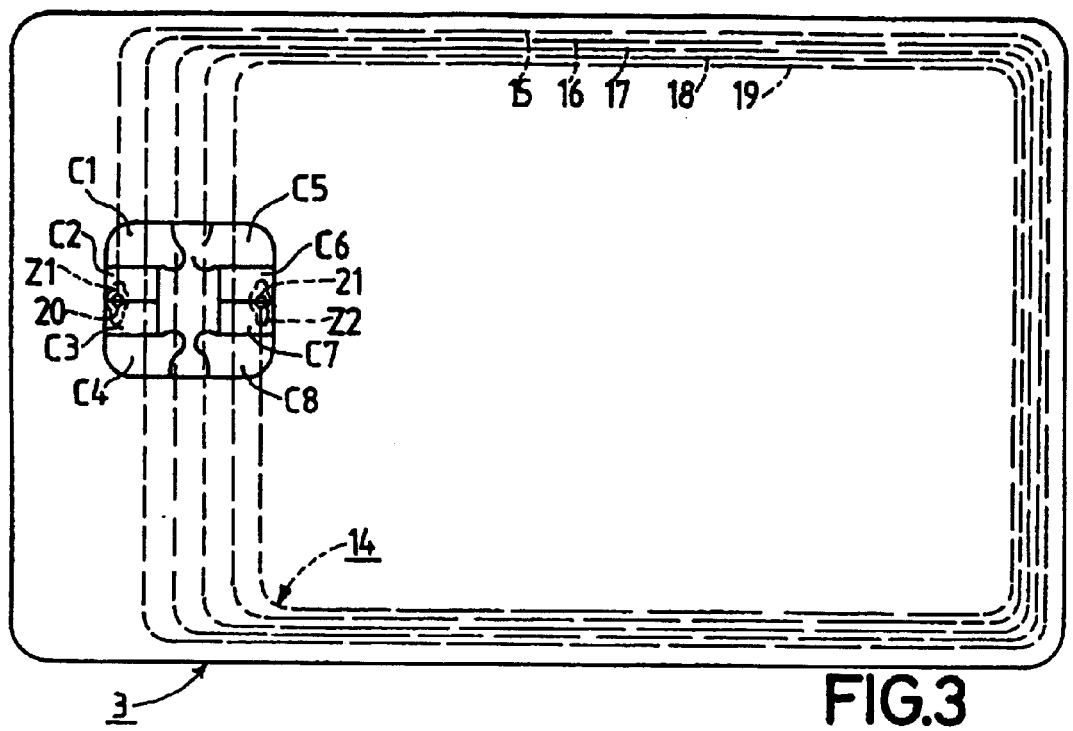
FIG. 3 shows in a top view a data medium according to an embodiment of the invention with the data medium accommodating the module in accordance with FIG. 1.

FIG. 1 shows a module 1. The module 1 has a substrate 2 produced using a flexible epoxy tape. The module 1 has an internal side, which in accordance with FIG. 1 lies on the side of the substrate 2 facing the observer. In addition, the module 1 has an external side which in accordance with FIG. 1 lies on the side of substrate 2 turned away from the observer. The module 1 is intended and designed for use in a data carrier 3. A data carrier 3 of this kind is shown in FIG. 3. The data carrier 3 may be used to support or assist the performance of both operations with contacts and operations without contacts.

The module 1 in accordance with FIG. 1 contains an integrated component 4, which is connected to the substrate 2 on the internal side of the module 1, for example by means of a bonded joint. The integrated component 4 has seven (7) component connections A1, A2, A3, A4, A5, A7, A8. Of these seven (7) component connections, the five (5) component connections A1, A2, A3, A5, A7 are used for operations with contacts and here being in an electrically conductive connection with counter contacts in a communication station, but this is not shown in FIG. 1. The two (2) other component connections A4 and A8 are used for contactless operations and here being in an electrically conductive connection with counter contacts of transmission means which work in a contactless manner in, but this is also not shown in FIG. 1.

In addition, the module 1 has a contact field 5 accessible to counter contacts, which is provided on the external side of the module 1. In this case, the contact field 5 has a total of eight (8) module connecting contacts C1, C2, C3, C4, C5, C6, C7, C8. These module connecting contacts C1 to C8 are connected on the external side of the module 1 with the substrate 2. Here, the module connecting contacts C1 to C8 are formed by gold-plated copper layers which were applied to the substrate 2 in such a way that a copper foil was applied in a laminating procedure on the entire area of the epoxy tape used to produce the substrate 2 and then interruptions are made in the copper film applied on the entire area by means of an etching procedure separating the module connecting contacts C1 to C8 from each other. The production of the module connecting contacts C1 to C8 may also take place in such a way that a continuous copper foil is first provided with interruptions by means of a punching process, with the interruptions serving to separate the module connecting contacts C1 to C8 in the finished module 1, and the punched copper film then being connected to the flexible epoxy tape used to produce the substrate 2 by means of a laminating procedure. The two production procedures are used to produce a multitude of modules 1 in a strip-shaped configuration, with the individual modules 1 being punched out of this strip-type configuration. It should also be mentioned that contact field 5 is designed in accordance with Standard ISO 7816-2.

In module 1, each component connection A1, A2, A3, A5, A7 used for operations with contacts has an electrically conductive connection with a module connecting contact C1, C2, C3, C5, C7 with the aid of bonding wires B1, B2, B3, B5, B7. Here, one end of each bonding wire B1, B2, B3, B5, B7 is connected to the relevant component connection A1, A2, A3, A5, A7 and the other end to the relevant module connecting contact C1, C2, C3, C5, C7 in each case through a hole H1, H2, H3, H5, H7 provided in the substrate 2.

In one particular advantageous embodiment of module 1, each component connection A4, A8 used for operations without contacts also has an electrically conductive connection with a module connecting contact C4, C8 in the contact field 5. In the module 1 in accordance with FIG. 1, these electrically conductive connections are achieved as described in the following. Starting from the module connecting contact A4, a bonding wire B4' is connected to a first connecting eyelet 6 of a first circuit board configuration 7 provided on the inner side of the module 1 and connected to the substrate 2. The first circuit board configuration 7 has a second connecting eyelet 8. From the second connecting eyelet 8, another bonding wire B4" is fed through a hole H4 in the substrate 2 to the module connecting contact C4. From the component-connection A8, a bonding wire B8' is fed to a first connecting eyelet 9 in a second circuit board configuration 10 and connected to the connecting eyelet 9. The second circuit board configuration 10 has a second connecting eyelet 11. From the second connecting eyelet 11, another bonding wire B8" is fed through a hole H8 in the substrate 2 to the module connecting contact C8. This establishes the connection between the component connection A4 and the module connecting contact C4 with the aid of the bonding wire B4' and the first circuit board configuration 7 and the other bonding wire B4". The electrically conductive connection between the component connection A8 and the module connecting contact C8 is achieved with the aid of the bonding wire B8' and the second circuit board configuration 10 and the other bonding wire B8".

In addition, in the module 1 in accordance with FIG. 1, the embodiment is selected so that each component connection A4, A8 used for operations without contacts also has an electrically conductive connection to a supplementary connecting contact Z1, Z2 with each supplementary connecting contact Z1, Z2 being intended and designed to provide an electrically conductive connection with a counter contact of transmission means which work in a contactless manner, but this is not shown in FIG. 1. For the electrically conductive connection of the component connection A4 with the supplementary connecting contact Z1, the first circuit board configuration 7 has a laterally protruding bar 12. For the electrically conductive connection of the component connection A8 with the supplementary connecting contact Z2, in a similar way, the second circuit board configuration 10 has a laterally protruding bar 13.

Figure 2:
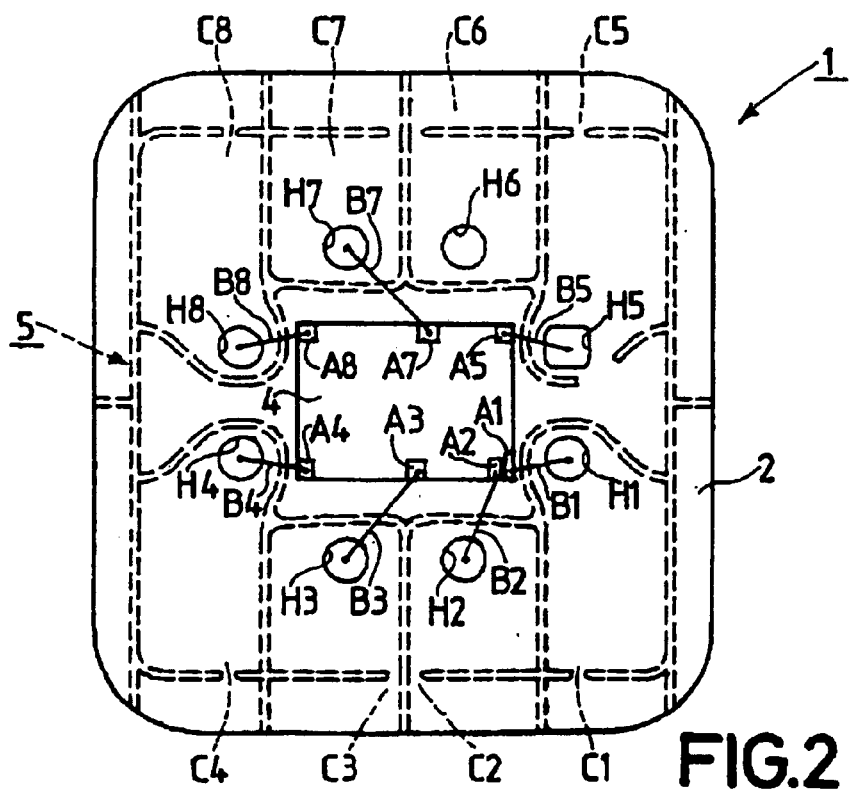
FIG. 2 shows in a similar way to FIG. 1 a module according to a second embodiment of the invention.

FIG. 2 shows another module 1 which essentially differs from the module 1 in accordance with FIG. 1 in the embodiment of the electrically conductive connections between the component connections A4 and A8 used in operations without contacts and the module connecting contacts C4 and C8 of the contact field 5. In the module 1 in accordance with FIG. 1, the connection between the component connection A4 and the module connecting contact C4 is achieved with the aid of only one single bonding wire B4. In a similar way, the electrically conductive connection between the component connection A8 and the module connecting contact C8 is achieved with one single bonding wire B8.

With regard to the two above-described embodiments of a module 1, it is noted that the module connection C6 and the hole H6 in the substrate 2 are not used.

As already mentioned, FIG. 3 shows the data carrier 3, which is equipped with the module 1 in accordance with FIG. 1. In addition, for contactless communications, the data carrier 3 contains a transmission coil 14, which is only shown schematically in FIG. 3. The transmission coil 14 has five (5) turns 15, 16, 17, 18, 19. In addition, the transmission coil 14 has two coil connections 20 and 21 which form counter contacts 20 and 21 of the transmission coil 14 and are connected to the supplementary connecting contacts Z1 and Z2 in the module 1. In this way, a data carrier 3 is achieved which is suitable for both the performance of operations with contacts and the performance of operations without contacts without additional precautions and measures.

However, it should be noted with reference to the data carrier 3 in accordance with FIG. 3 that this data carrier 3 may also be achieved in another variant of the embodiment. In this variant of the embodiment, the data carrier 3 does not itself contain a transmission coil, but only the module 1 in accordance with FIG. 1. This variant of the embodiment of the data carrier 3 is intended to be used in a suitably designed apparatus with this apparatus then containing a transmission coil, with the transmission coil contained in the apparatus being an electrically conductive connection via the module connecting contacts C4 and C8 with the component connections A4 and A8 of the integrated component 4, so that after the insertion of the variant of the embodiment of the data carrier 3 in accordance with FIG. 3 in the above-described apparatus a data carrier configuration capable of contactless communication is obtained, with this data carrier configuration consisting of a data carrier 3 containing only one module 1 and an external transmission coil in relation to the data carrier 3.

Figure 4:
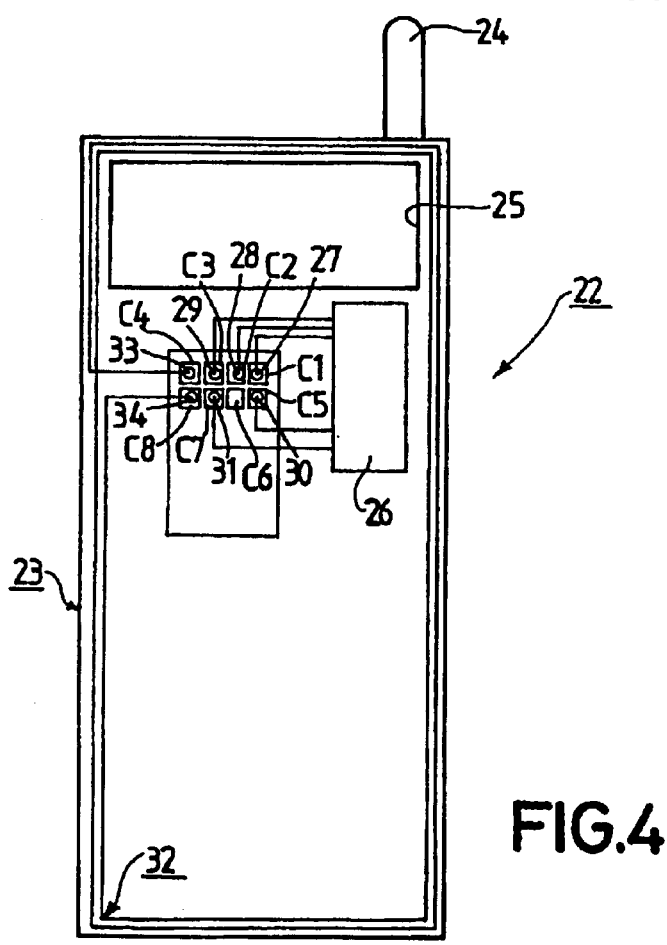
FIG. 4 shows in a schematicized way a device according to an embodiment of the invention comprising a mobile telephone and with the data medium being accommodated in the device in accordance with FIG. 2, but here it is only shown schematically.

FIG. 4 shows a device 22 according to the invention. The device 22 is a so-called mobile telephone. The device 22 has a housing 23. From the housing 23, a transmitting/receiving antenna 24 protrudes. In addition, the device 22 has a schematically indicated display device 25.

The device 22 is intended to accommodate and work with a data carrier 3. In this case, the data carrier 3 contains the module 1 in accordance with FIG. 2, of which, however, FIG. 4 only has a schematic representation of the contact field 5. The contact field 5 consists of the module connecting contacts C1, C2, C3, C4, C5, C6, C7, C8.

The device 22 contains a communications station 26 having counter contacts 27, 28, 29, 30, 31, with which the module connecting contacts C1, C2, C3, C5, C7 in the module 1 of the data carrier 3 accommodated in the device 22 are brought into contact, with module connecting contacts C1, C2, C3, C5, C7 being in an electrically conductive connection with the component connections used in operations with contacts A1, A2, A3, A5, A7.

In addition, the device 22 comprising transmission means which work in a contactless manner, which in the device 22 are formed by a transmission coil 32. The transmission coil 32 has counter contacts 33 and 34, with which the module connecting contacts C4 and C8 of the data carrier 3 in the device 22 are brought into contact, with module connecting contacts C4 and C8 being in an electrically conductive connection with the component connections A4 and A8 used for operations without contacts.

The device 22 has the advantage that the data carrier 3 may be designed without a transmission coil, because the transmission coil 32 required for contactless communication is contained in the device 22, which has the advantage that the transmission coil 32 may be designed much larger than in the case when the transmission coil has to be contained in the much smaller data carrier 3. When inserting the data carrier 3 in the device 22, the module connecting contacts C4 and C5 automatically establish an electrically conductive connection with the counter contacts 33 and 34 in the transmission coil 32, thus achieving a data carrier configuration suitable for contactless communication. As the electrically conductive connection with the transmission coil 32 is produced by the module connecting contacts C4 and C8 which are already provided, a structurally particularly simple design is achieved.

With device 22, there may also be a provision for the communication device 26 to be equipped with two other counter contacts, which may enter into an active connection with the module connecting contacts C4 and C8 and for the transmission coil 32 to be connected to the communication device 26, so that then the electrically conductive connection between the transmission coil 32 and the component connections A4 and A8 to be provided with an electrically conductive connection with the transmission coil 32 is provided via communication station 26. One advantage of an embodiment of this type is that commercially available data carrier contact equipment requiring only little adaptation may be used for the electrically conductive connection to the module connecting contacts in a data carrier according to the invention or a module according to the invention.

With the above-described data carrier 3 and the above-described device 22, the transmission media which work in a contactless manner are each formed from a transmission coil 14 or 32. However, instead of a transmission coil, it is also possible to provide transmission means with an electrostatic or capacitive action.

The above describes a mobile telephone as a device 22 according to the invention. The measures according to the invention may obviously also be used in numerous other devices and appliances.

What is claimed is:

1. A module for a data carrier which may be used for both operations with contacts and operations without contacts, with the module containing an integrated component, which has component connections used for operations with contacts and here being in an electrical conductive connection with counter contacts of a communication station and having component connections used for operations without contacts and here being in an electrically conductive connection with counter contacts of a transmission means which work in a contactless manner, and with the module having a contact field with module connecting contacts accessible to counter contacts, wherein each component connection used for operations with contacts being in an electrically conductive connection with a module connecting contact of the contact field and wherein each component connection used for operations without contacts also being in an electrically conductive connection with a module connecting contact of the contact field, wherein each component connection used for operations without contacts is also in an electrically conductive connection with a supplementary connecting contact for providing an electrically conductive connection with a counter contact of the transmission means which work in a contactless manner.

2. A module as claimed in claim 1, wherein the contact field is designed in accordance with Standard ISO 7816-2.

3. A data carrier which may be used to support the performance of both operations with contacts and operations without contacts and which comprises a module, with the module containing an integrated component which has component connections used for operations with contacts and here being in an electrically conductive connection with counter contacts of a communication station and having component connections used for operations without contacts and here being in an electrically conductive connection with counter contacts of transmission means which work in a contactless manner, and with the module having a contact field with module connecting contacts accessible to counter contacts, wherein each component connection used for operations with contacts being in an electrically conductive connection with a module connecting contact of the contact field and wherein each component connection used for operations without contacts also being in an electrically conductive connection with a module connecting contact of the contact field wherein each component connection used for operations without contacts is also in an electrically conductive connection with a supplementary connecting contact for providing an electrically conductive connection with a counter contact of the transmission means which work in a contactless manner, with the transmission means being contained in the data carrier.

4. A data carrier as claimed in claim 3, wherein the contact field is designed in accordance with Standard Iso 7816-2.

5. A device designed to accommodate and work with a data carrier as claimed in claim 3, and containing a communication station wherein the device having counter contacts, the counter contacts may be brought into contact with the module connecting contacts of the module of the data carrier which may be accommodated in the device, which module connecting contacts being in an electrically conductive connection with the component connections used for operations with contacts, and wherein the device having transmission means which work in a contactless manner and which have counter contacts, the counter contacts may be brought into contact with the module connecting contacts of the data carrier which may be accommodated in the device, which module connecting contacts being in an electrically conductive connection with the component connections used for operations without contacts.

* * * * *